United States Patent
Terashima

(10) Patent No.: US 9,946,938 B2
(45) Date of Patent: Apr. 17, 2018

(54) IN-VEHICLE IMAGE PROCESSING DEVICE AND SEMICONDUCTOR DEVICE

(71) Applicant: Renesas Electronics Corporation, Kawasaki-shi (JP)

(72) Inventor: Kazuaki Terashima, Kawasaki (JP)

(73) Assignee: RENESAS ELECTRONICS CORPORATION, Kawasaki-Shi, Kanagawa (JP)

(*) Notice: Subject to any disclaimer, the term of this patent is extended or adjusted under 35 U.S.C. 154(b) by 136 days.

(21) Appl. No.: 14/523,871

(22) Filed: Oct. 25, 2014

(65) Prior Publication Data
US 2015/0145997 A1 May 28, 2015

(30) Foreign Application Priority Data

Nov. 22, 2013 (JP) ................................. 2013-241614

(51) Int. Cl.
*G06K 9/00* (2006.01)
*B60R 1/00* (2006.01)
*H04N 13/02* (2006.01)

(52) U.S. Cl.
CPC ............ *G06K 9/00791* (2013.01); *B60R 1/00* (2013.01); *B60R 2300/105* (2013.01);
(Continued)

(58) Field of Classification Search
CPC .................. G06K 9/00791; B60R 1/00; B60R 2300/105; B60R 2300/303; B60R 2300/306; B60R 2300/605; B60R 2300/70
(Continued)

(56) References Cited

U.S. PATENT DOCUMENTS 6,734,896 B2  5/2004  Nobori et al.
7,253,833 B2  8/2007  Imoto
(Continued)

FOREIGN PATENT DOCUMENTS

JP  2002-27448 A  1/2002
JP  2003-153251 A  5/2003
(Continued)

OTHER PUBLICATIONS

Japanese Office Action dated Aug. 15, 2017, with an English Translation thereof.

*Primary Examiner* — William C Vaughn, Jr.
*Assistant Examiner* — Jae N Noh
(74) *Attorney, Agent, or Firm* — McGinn IP Law Group, PLLC

(57) ABSTRACT

An in-vehicle image processing device capable of appropriately monitoring areas forward of, around, and rearward of a vehicle is provided at low cost. The device is for mounting on a vehicle and includes a camera, an image processing unit, and a determination unit. With a reflector provided in front of the camera, the camera can image, for display in a frame at a time, a first area forward of the vehicle and a second area, e.g. an area around the vehicle. In the image processing unit supplied with such image data from the camera, either the first-area image or the second-area image is appropriately processed whereas image processing is omitted for the other image. Alternatively, both images are subjected to a same image processing. The determination unit supplied with vehicle speed information supplies appropriate control instruction information based on the current vehicle speed to the image processing unit.

21 Claims, 11 Drawing Sheets

(52) U.S. Cl.
CPC ... *B60R 2300/303* (2013.01); *B60R 2300/306* (2013.01); *B60R 2300/605* (2013.01); *B60R 2300/70* (2013.01); *H04N 13/0239* (2013.01); *H04N 2213/001* (2013.01)

(58) Field of Classification Search
USPC .......................................................... 348/148
See application file for complete search history.

(56) References Cited

U.S. PATENT DOCUMENTS

| | | | |
|---|---|---|---|
| 8,525,882 B2 | 9/2013 | Onishi et al. | |
| 2003/0169902 A1* | 9/2003 | Satoh | G06T 1/00 382/104 |
| 2004/0109060 A1* | 6/2004 | Ishii | B60R 1/00 348/148 |
| 2010/0277935 A1* | 11/2010 | Endo | B60Q 1/0023 362/466 |
| 2010/0283837 A1* | 11/2010 | Oohchida | G06T 7/0075 348/47 |
| 2012/0162420 A1 | 6/2012 | Onishi | |
| 2012/0206602 A1* | 8/2012 | Clucas | G06T 7/2033 348/149 |
| 2014/0313335 A1* | 10/2014 | Koravadi | H04N 7/181 348/148 |

FOREIGN PATENT DOCUMENTS

| | | |
|---|---|---|
| JP | 2011-20669 A | 2/2011 |
| JP | 2012-131390 A | 7/2012 |

\* cited by examiner

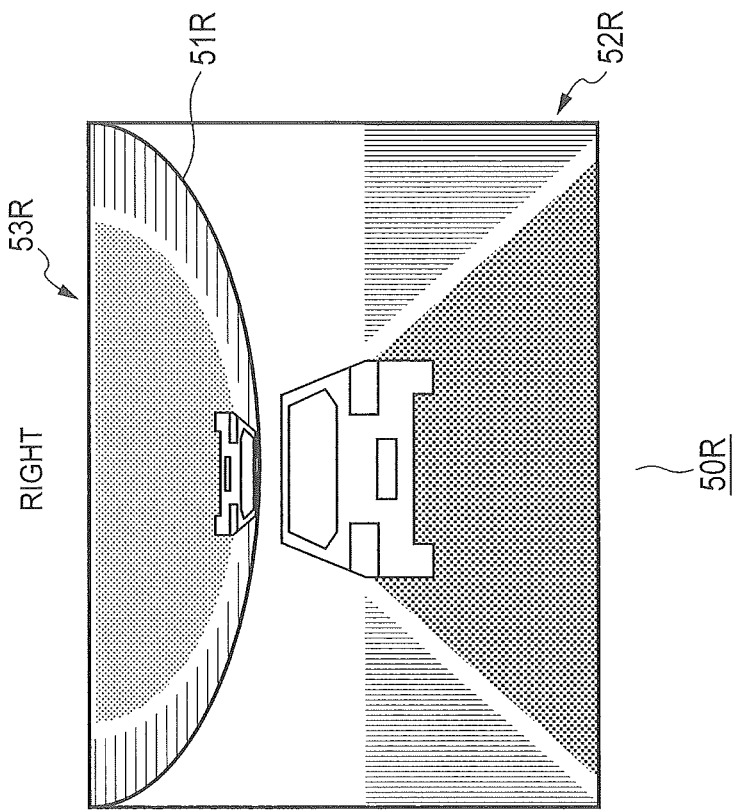
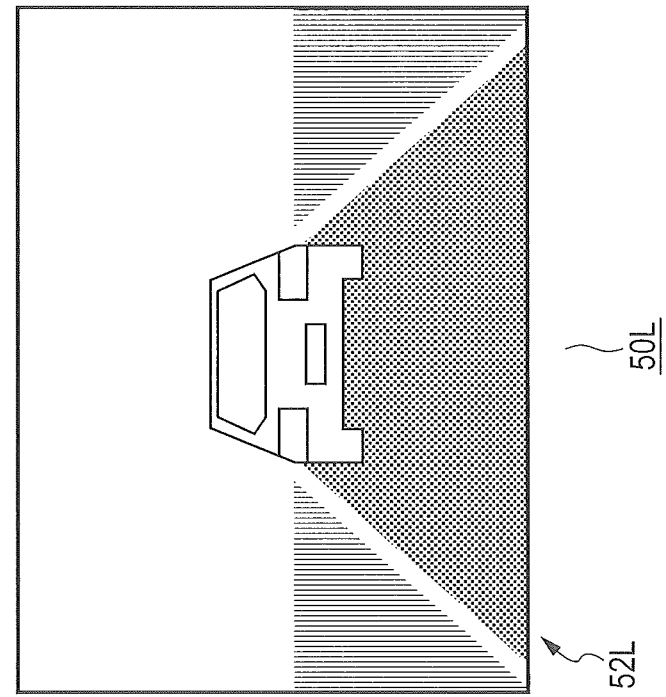

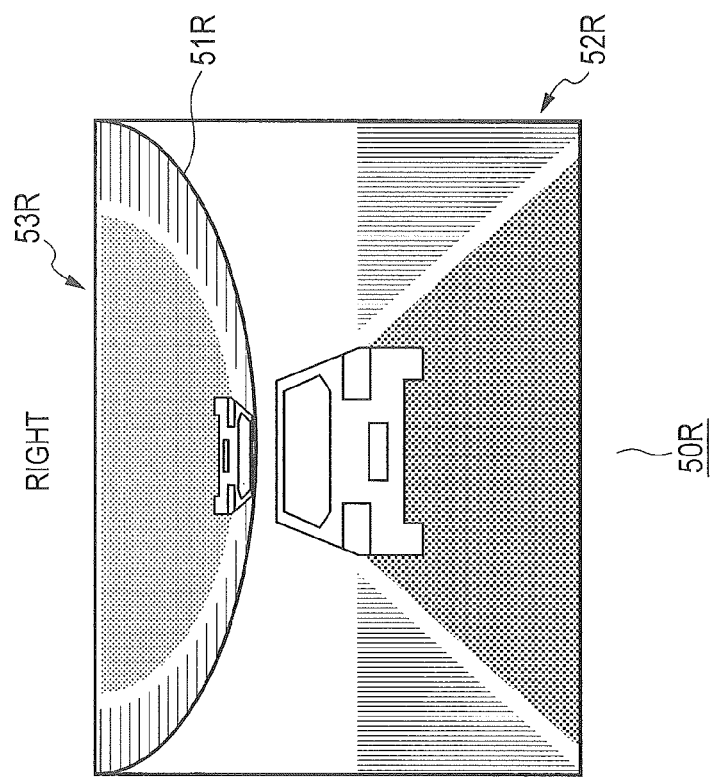
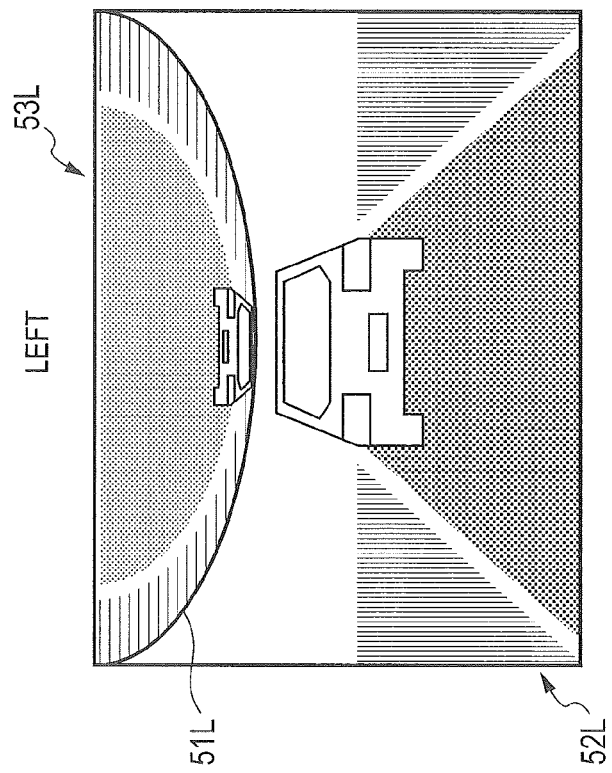

IN-VEHICLE IMAGE PROCESSING DEVICE AND SEMICONDUCTOR DEVICE

CROSS-REFERENCE TO RELATED APPLICATIONS

The disclosure of Japanese Patent Application No. 2013-241614 filed on Nov. 22, 2013 including the specification, drawings and abstract is incorporated herein by reference in its entirety.

FIELD OF THE INVENTION

The present invention relates to an in-vehicle image processing device and a semiconductor device mountable thereon. Particularly, the present invention can be suitably applied to an in-vehicle image processing device equipped with an in-vehicle camera capable of both forward monitoring and peripheral monitoring.

BACKGROUND

Monitoring systems for monitoring areas forward of, around, and/or rearward of a vehicle using a camera or cameras are at a practical level as in-vehicle safety mechanisms. Such monitoring systems, in many cases, use radars or sonar devices as sensors in combination with cameras. An in-vehicle monitoring system includes an image input unit, i.e. a camera provided with an image sensor, an image processing unit to perform image processing, and a determination unit to perform processing for making determination. Generally, an in-vehicle monitoring system includes a processing unit for each sensor used in the system.

To monitor not only an area forward of a vehicle but also an area around or rearward of the vehicle, it is necessary to use as many image processing units as required in addition to a required number of cameras (image sensors). This causes a cost increase.

An in-vehicle camera capable of largely and sharply displaying an image of a particular area and also capable of displaying images of plural different areas at a time is disclosed in Japanese Unexamined Patent Application Publication No. 2012-131390. The in-vehicle camera can perform the above two types of operation by changing the orientation of a mirror positioned forward of an imaging element. According to the above patent document, the in-vehicle camera can display images of plural different areas simultaneously by adjusting the orientation of the mirror. To be more concrete, as described in paragraph 0041 of the patent document, an upper half portion of the imaging range of the camera images an area forward of the vehicle and a lower half portion of the imaging range images an interior portion of and an area rearward of the vehicle.

An in-vehicle camera capable of imaging plural objects is disclosed in Japanese Unexamined Patent Application Publication No. 2011-20669. As shown in FIG. 4 included in the patent document and described in paragraphs 0037 to 0039 of the patent document, an area forward of the vehicle is shown in an upper half of a screen and an interior view of the vehicle and an area rearward of the vehicle are shown in a lower half of the screen of the camera unit.

SUMMARY

As a result of studying the above patent documents 1 and 2, the present inventors have found out that there are problems to be addressed to as follows.

According to the techniques disclosed in the above patent documents, a single camera (image sensor) can image plural areas, for example, an area forward of a vehicle and an interior portion of the vehicle, for use by a user. In the patent documents, however, no method or contents of image processing to be applied to the image data on such plural areas to be displayed at a time are disclosed.

According to paragraph 0037 of Japanese Unexamined Patent Application Publication No. 2012-131390 referred to above, blown-out highlights and blocked-out shadows on an image may be suppressed by subjecting the image to adaptive image enhancer processing using an image processing LSI (large-scale integrated circuit). Adaptive image enhancer processing is said to be processing in which an image is divided into plural sections and the sections are individually subjected to level correction. The systems disclosed in the above patent documents include no determination unit. The images outputted in the systems are for recording on a drive recorder or for viewing by a vehicle driver while driving a vehicle, so that the relatively simple image processing as described above may be good enough.

However, it has been found out that the relatively simple image processing as described above is not good enough for an in-vehicle image processing device which includes a determination unit in a rear stage of its image processing unit for use in high-degree determination processing for calculating a distance between vehicles or for detecting an obstacle. Namely, even if image data representing images of plural areas, i.e. image data on simultaneously captured images of, for example, an area forward of a vehicle and an interior portion of the vehicle, is obtained using a single camera (image sensor), as many image processing units as the number of simultaneously imaged areas are required, so that the cost of the image processing device cannot be adequately suppressed. Since it is necessary to perform in-vehicle image processing on a real time basis, images of plural areas are required to be processed simultaneously and concurrently.

Means of solving the above problems will be described in the following. Other objects and novel features of the present invention will become apparent from the description of this specification and the accompanying drawings.

According to an embodiment of the present invention, a means of solving the above problems is as follows.

An in-vehicle image processing device for mounting on a vehicle includes a camera, an image processing unit, and a determination unit. In the in-vehicle image processing device, a reflector is provided forward of the camera, so that the camera can image, for display in a frame, an area forward of the vehicle and another area, for example, an area around the vehicle simultaneously. The image processing unit supplied with such image data from the camera subjects only one of the image of an area forward of the vehicle or the image, for example, of an area around the vehicle to appropriate image processing based on control instruction information supplied from the determination unit. For the other image, the image processing unit can omit image processing. The determination unit supplied with vehicle speed information supplies appropriate control instruction information based on the current vehicle speed to the image processing unit. Alternatively, the image processing unit may be configured to subject the image data on both areas, for example, an area forward of the vehicle and another area around the vehicle to appropriate image processing based on the control instruction information.

The effect of the above embodiment can be summarized as follows.

The in-vehicle image processing device can perform optimum image processing to obtain information required in making determination based on the vehicle speed and requires only one image processing unit for plural image areas, so that the cost of the device can be held low.

BRIEF DESCRIPTION OF THE DRAWINGS

FIGS. 10A and 10B are diagrams for explaining image data generated by the in-vehicle image processing device according to the second embodiment, FIG. 10A showing image data taken by a left camera and FIG. 10B showing image data taken by a right camera.

FIGS. 13A and 13B are diagrams for explaining image data generated by the in-vehicle image processing device according to the third embodiment, FIG. 13A showing image data taken by a left camera and FIG. 13B showing image data taken by a right camera.

DESCRIPTION OF THE PREFERRED EMBODIMENTS

1. Outline of Preferred Embodiments

Figure 1:
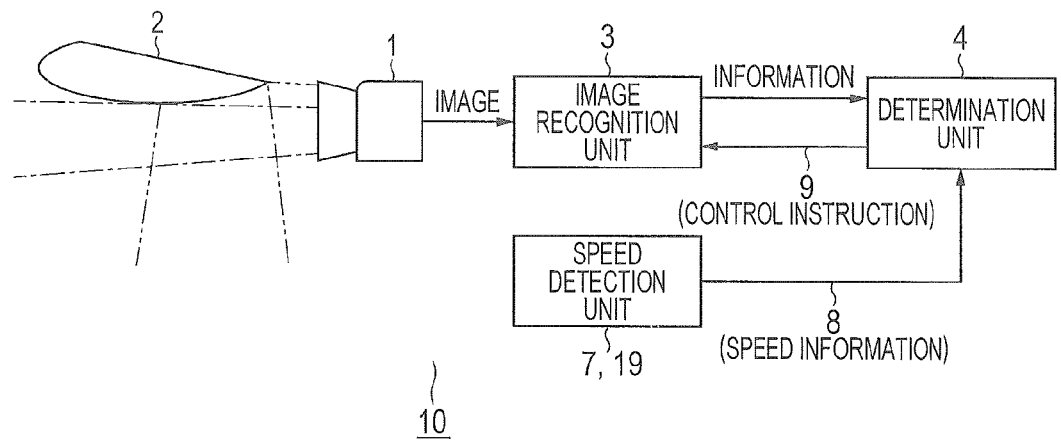
FIG. 1 is a block diagram showing an example configuration of an in-vehicle image processing device according to a first embodiment of the present invention.

First, typical embodiments disclosed in this application will be outlined. Note that the reference numerals used in attached drawings and referred to, in parentheses, in the following outline description of the typical embodiments of the present invention merely represent exemplary constituent elements included in the concepts of possible constituent elements.

[1] Optimum Image Processing for Each Image Area Based on Speed Information

The typical embodiments disclosed in this application each concern an in-vehicle image processing device (10) for mounting on a vehicle. The in-vehicle image processing device (10) includes a camera (1), an image recognition unit (3), and a determination unit (4) and is configured as follows.

The determination unit is configured to be able to receive speed information (8) on the vehicle and supply control instruction information (9) based on the speed information to the image recognition unit.

The image recognition unit receives image data (50) from the camera. The image data (50) includes image data for a first image area (52) to show an image of an area forward of the vehicle and image data for a second image area (53) to show an image of an area in a different direction. The first image area (52) and the second image area (53) are simultaneously included in a frame. The image recognition unit is configured to be able to subject the image data for both the first image area and the second image area to image processing (S1 to S7) based on the control instruction information and supply the results of the processing to the determination unit.

The above arrangement allows the in-vehicle image processing device to perform optimum image processing to obtain information required for making determination based on the vehicle speed. Since, in this way, a single image recognition unit can be applied to plural image areas, the cost of the device can be held low.

[2] Processing Forward Image when Traveling at High Speed and Peripheral Image when Traveling at Low Speed In item [1] above, the second image area shows an image of an area around the vehicle (a vehicle-peripheral image).

The determination unit is configured to be able to supply control instruction information to the image recognition unit. When the speed information indicates that the vehicle is traveling at high speed, the control instruction information supplied by the determination unit is for having the image data for the first image area processed (S2, S5) in a manner suitable for a distant view while having image processing omitted for the image data for the second image area. When the speed information indicates that the vehicle is traveling at low speed, the control instruction information supplied by the determination unit is for having the image data for the second image area processed (S3, S6) in a manner suitable for a near view while having image processing omitted for the image data for the first image area.

In this way, when the vehicle is traveling at high speed, only the vehicle-forward image is used as image information for making determination (forward monitoring) and, when the vehicle is traveling at low speed, only the vehicle-peripheral image is used as image information for making determination (peripheral monitoring), so that a single image recognition unit can be applied to plural image areas. This allows the cost of the device to be held low.

[3] Processing of Full Image Including Both Forward Image and Peripheral Image

In item [2] above, the determination unit is configured to be able to also supply an additional type of control instruction information to the image recognition unit. The additional type of control instruction information is for having the image data for both the first image area and the second image area processed (S4, S7) in a manner suitable for an intermediate distance view relative to image processing suitable for a distant view and image processing suitable for a near view.

This makes it possible to perform appropriate image processing even when the vehicle is traveling at speed determined neither as high speed nor as low speed.

[4] Extraction of Speed Information from Image Data

In one of items [1] to [3] above, the image recognition unit further has a function (19) for calculating, based on the image data, speed information on the vehicle and supplying the speed information to the determination unit.

The above function makes it unnecessary to have a speed sensor signal inputted from outside, so that a lower-cost in-vehicle image processing device can be provided. Or, using both a speed sensor signal inputted from outside and the speed information calculated by the image recognition unit in a mutually complementary manner makes it possible to provide an in-vehicle image processing device capable of determining the vehicle speed with higher accuracy.

[5] Stereo Camera System

In one of items [1] to [5] above, the in-vehicle image processing device uses the foregoing camera as a first camera (1R) and processes the foregoing image data as first image data and (50R) further includes a second camera (1L) which, along with the first camera, makes up a pair of right and left cameras. The second camera is configured to be able to supply second image data (50L) to the image recognition unit. The second image data represents a vehicle-forward image to be shown in a frame. The image recognition unit is configured to be able to perform image recognition processing (33) based on the parallax between the image data for the first image area (52R) and the image data for the second image area (52L) both included in the first image data.

The above arrangement allows the stereo camera system to appropriately switch, based on the vehicle speed, between image processing including parallax detection and vector detection performed based on vehicle-forward images and image processing for a vehicle-peripheral image to be performed for making determination.

[6] Left and Right Cameras of Stereo Camera System Each Provided with Reflector

In item [5] above, the second image data contains image data for a third image area (52L) to show a vehicle-forward image and image data for a fourth image area (53L) to show a vehicle-peripheral image. The third image area and the fourth image area are simultaneously included in a frame.

The image recognition unit is configured to be able to perform image recognition processing (33) based on the parallax between the image data for the first image area (52R) included in the first image data and the image data for the third image area (52L) included in the second image data.

The determination unit is configured to be able to supply control instruction information to the image recognition unit. The control instruction information is for, when the speed information indicates that the vehicle is traveling at high speed, having the image data for the first image area (52R) and the image data for the third image area (52L) processed in a manner suitable for a distant view (S2, S5) while having image processing omitted for the image data for the second image area (53R) and the image data for the fourth image area (53L) and for, when the speed information indicates that the vehicle is traveling at low speed, having the image data for the second image area (53R) and the image data for the fourth image area (53L) processed in a manner suitable for a near view (S4, S7) while having image processing omitted for the image data for the first image area (52R) and the image data for the third image area (52L).

The above arrangement allows, with the stereo camera system including the left and right cameras, appropriate switching, based on the vehicle speed, between image processing for an image of an area forward of the vehicle (a vehicle-forward image) and image processing for an image of an area around the vehicle (a vehicle-peripheral image) to be performed for making determination.

[7] Viewpoint Change and Image Synthesis

In one of items [1] to [6] above, the image recognition unit further has a function to convert the image data for each image area into image data for each image area based on a prescribed viewpoint and synthesize an image using the image data for each image area based on the prescribed viewpoint.

This arrangement makes it possible to provide an in-vehicle image processing device which can generate an image based on a changed viewpoint using fewer cameras than required in the related art and a single image recognition unit.

[8] Blind Spot Image Presumption for Image Synthesis Associated with Viewpoint Change In item [7] above, the image recognition unit synthesizes an image (56) of a spot, image data on which is included in image data for plural image areas. The image recognition unit synthesizes the image (56) by having the image data for the plural image areas mutually complemented based on parallaxes between them. Concerning an image (57) of a spot not included in the image data for any of the plural image areas, the image recognition unit further has a function to generate such an image by presumption based on image data on a past frame or based on image data for an edge portion of the plural image areas or to output prescribed image data for indicating that the image data on such a spot cannot be generated by presumption.

The above arrangement makes it possible to provide an in-vehicle image processing device which can generate image data, covering even blind spots of cameras, based on a changed viewpoint.

[9] Semiconductor Device Capable of Optimum Image Processing for Each Image Area Based on Speed Information A typical embodiment disclosed in this application represents a semiconductor device (20) which includes an image recognition unit (3) and a determination unit (4) and which can configure, by being coupled with an in-vehicle camera (1), an in-vehicle image processing device (10) for mounting on a vehicle. The semiconductor device (20) is configured as follows.

The determination unit is configured to be able to receive speed information (8) on the vehicle and supply control instruction information (9) based on the speed information to the image recognition unit.

The image recognition unit receives image data (50) from the camera. The image data (50) includes image data for a first image area (52) to show an image of an area forward of the vehicle and image data for a second image area (53) to show an image of an area in a different direction. The first image area (52) and the second image area (53) are simultaneously included in a frame. The image recognition unit is configured to be able to subject the image data for both the first image area and the second image area to image processing (S1 to S7) based on the control instruction information and supply the results of the processing to the determination unit.

The above arrangement allows the image recognition unit of the semiconductor device to perform optimum image processing to obtain information required for making determination based on the vehicle speed. Since, in this way, a single image recognition unit can be applied to plural image areas, the cost of the device can be held low.

[10] Processing Forward Image when Traveling at High Speed and Peripheral Image when Traveling at Low Speed In item [9] above, the second image area shows an image of an area around the vehicle (a vehicle-peripheral image). The determination unit is configured to be able to supply control instruction information to the image recognition unit. When the speed information indicates that the vehicle is traveling at high speed, the control instruction information supplied by the determination unit is for having the image data for the first image area (52) processed (S2, S5) in a manner suitable for a distant view while having image processing omitted for the image data for the second image area (53). When the speed information indicates that the vehicle is traveling at low speed, the control instruction information supplied by the determination unit is for having the image data for the second image area processed (S3, S6) in a manner suitable for a near view while having image processing omitted for the image data for the first image area.

In this way, when the vehicle is traveling at high speed, only the vehicle-forward image is used as image information for making determination (forward monitoring) and, when the vehicle is traveling at low speed, only the vehicle-peripheral image is used as image information for making determination (peripheral monitoring), so that a single image recognition unit can be applied to plural image areas. This allows the cost of the device to be held low.

[11] Processing of Full Image Including Both Forward Image and Peripheral Image

In item [10] above, the determination unit is configured to be able to also supply an additional type of control instruction information to the image recognition unit. The additional type of control instruction information is for having the image data for both the first image area and the second image area processed (S4, S7) in a manner suitable for an intermediate distance view relative to image processing suitable for a distant view and image processing suitable for a near view.

This makes it possible to perform appropriate image processing even when the vehicle is traveling at speed determined neither as high speed nor as low speed.

[12] Extraction of Speed Information from Image Data

In one of items [9] to [11] above, the image recognition unit further has a function (19) for calculating, based on the image data, speed information on the vehicle and supplying the speed information to the determination unit.

The above function makes it unnecessary to have a speed sensor signal inputted from outside, so that a lower-cost in-vehicle image processing device can be provided. Or, using both a speed sensor signal inputted from outside and the speed information calculated by the image recognition unit in a mutually complementary manner makes it possible to provide an in-vehicle image processing device capable of determining the vehicle speed with higher accuracy.

[13] Stereo Camera System

In one of items [9] to [12] above, the in-vehicle image processing device uses the foregoing camera as a first camera (1R) and processes the foregoing image data as first image data (50R) and further includes a second camera (1L) which, along with the first camera, makes up a pair of right and left cameras. The second camera is configured to be able to supply second image data (50L) to the image recognition unit. The second image data represents a vehicle-forward image to be shown in a frame. The image recognition unit is configured to be able to perform image recognition processing (33) based on the parallax between the image data for the first image area (52R) and the image data for the second image area (52L) both included in the first image data.

The above arrangement allows the stereo camera system to appropriately switch, based on the vehicle speed, between image processing including parallax detection and vector detection performed based on vehicle-forward images and image processing for a vehicle-peripheral image to be performed for making determination.

[14] Left and Right Cameras of Stereo Camera System Each Provided with Reflector In item [13] above, the second image data contains image data for a third image area (52L) to show a vehicle-forward image and image data for a fourth image area (53L) to show a vehicle-peripheral image. The third image area and the fourth image area are simultaneously included in a frame.

The image recognition unit is configured to be able to perform image recognition processing (33) based on the parallax between the image data for the first image area (52R) included in the first image data and the image data for the third image area (52L) included in the second image data.

The determination unit is configured to be able to supply control instruction information to the image recognition unit. The control instruction information is for, when the speed information indicates that the vehicle is traveling at high speed, having the image data for the first image area (52R) and the image data for the third image area (52L) processed in a manner suitable for a distant view (S2, S5) while having image processing omitted for the image data for the second image area (53R) and the image data for the fourth image area (53L) and for, when the speed information indicates that the vehicle is traveling at low speed, having the image data for the second image area (53R) and the image data for the fourth image area (53L) processed in a manner suitable for a near view (S4, S7) while having image processing omitted for the image data for the first image area (52R) and the image data for the third image area (52L).

The above arrangement allows, with the stereo camera system including the left and right cameras, appropriate switching, based on the vehicle speed, between image processing for a vehicle-forward image and image processing for a vehicle-peripheral image to be performed for making determination.

[15] Viewpoint Change and Image Synthesis

In one of items [9] to [14] above, the image recognition unit further has a function to convert the image data for each image area into image data for each image area based on a prescribed viewpoint and synthesize an image using the image data for each image area based on the prescribed viewpoint.

This arrangement makes it possible to provide a semiconductor device which can generate an image based on a changed viewpoint using fewer cameras than required in the related art and a single image recognition unit.

[16] Blind Spot Image Presumption for Image Synthesis Associated with Viewpoint Change In item [15] above, the image recognition unit synthesizes an image (56) of a spot, image data on which is included in image data for plural image areas. The image recognition unit synthesizes the image (56) by having the image data for the plural image areas mutually complemented based on parallaxes between them. Concerning an image (57) of a spot not included in the image data for any of the plural image areas, the image recognition unit further has a function to generate such an image by presumption based on image data on a past frame or based on image data for an edge portion of the plural image areas or to output prescribed image data for indicating that the image data on such a spot cannot be generated by presumption.

The above arrangement makes it possible to provide a semiconductor device which can generate image data, covering even blind spots of cameras, based on a changed viewpoint.

[17] Single Chip

In one of items 9 to 16 above, the semiconductor device is formed over a single semiconductor substrate.

This reduces the semiconductor device mounting area required in the in-vehicle image processing device, so that the cost of the in-vehicle image processing device can be held low.

2. Detailed Description of Preferred Embodiments

Embodiments of the present invention will be described in more detail below.

First Embodiment <Optimum Image Processing for Each Image Area Based on Speed Information>

FIG. 1 is a block diagram showing an example configuration of an in-vehicle image processing device 10 according to a first embodiment of the present invention.

The in-vehicle image processing device 10 includes a camera module 1 (hereinafter referred to simply as a "camera 1") having a lens and an image sensor, an image recognition unit 3, and a determination unit 4. The camera 1 provided with a reflector 2 is a so-called front camera and can take an image of an area forward of the vehicle where the camera 1 is mounted (hereinafter referred to simply as the "vehicle") (a vehicle-forward image) and an image of an area around the vehicle (a vehicle-peripheral image) for display in a single frame screen as being described in detail later with reference to FIGS. 4 and 5. The camera 1 is mounted, for example, on the back of a rearview mirror installed in the vehicle such that the camera 1 is oriented toward a driver's forward view.

Figure 2:
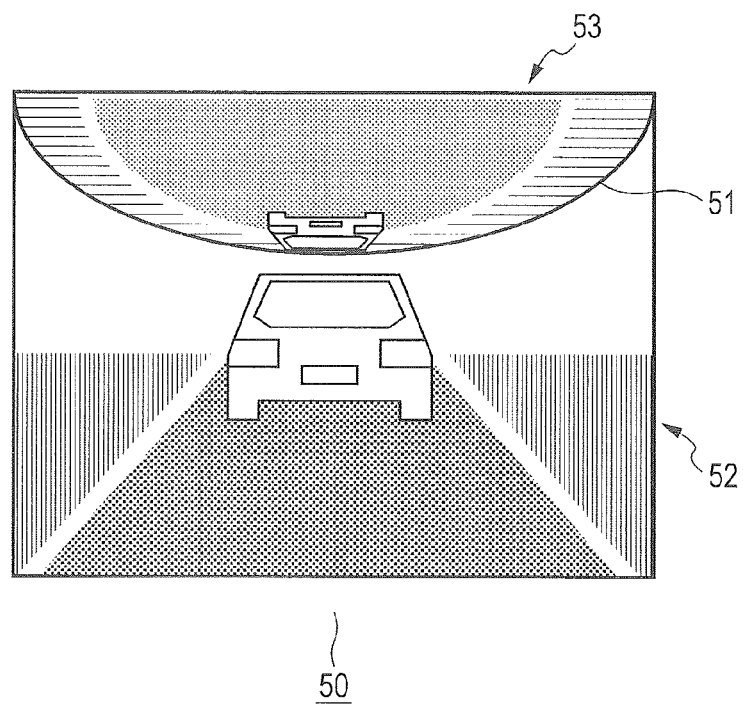
FIG. 2 illustrates image data processed in the in-vehicle image processing device according to the first embodiment.

FIG. 2 illustrates image data 50 processed in the in-vehicle image processing device 10 according to the first embodiment. The image data 50 displayed in a single frame includes images taken by the camera 1. One of the images is displayed above a border line 51 shown in the frame and the other image is displayed below the border line 51. The image area below the border line 51 is an image area 52 showing a vehicle-forward image directly taken by the camera 2 without involving the reflector 2. The image area above the border line 51 is an image area 53 showing a vehicle-peripheral image taken by the camera 2 via the reflector 2.

The determination unit 4 is supplied with speed information 8 about the vehicle. The in-vehicle image processing device 10 may have, as shown in FIG. 1, an independent speed detection unit 7 which detects speed information 8 and supplies the detected speed information to the determination unit 4. Alternatively, the in-vehicle image processing device 10 may be configured such that it detects speed information 8 using a speed detection unit 19 realized, as being described later, as a part of the function of the image recognition unit 3 and supplies the detected speed information to the determination unit 4. The determination unit 4 supplies, based on the speed information 8 supplied thereto, control instruction information 9 to the image recognition unit 3.

The image recognition unit 3 receives the image data 50 from the camera 1. The image data 50 includes the image data for both the image area 52 below the border line 51 and the image area 53 above the border line 51 simultaneously included in a frame. The image area 52 shows a vehicle-forward image. The image area 53 shows an image taken in a different direction. The image recognition unit 3 processes the image data for both the image area 52 and the image area 53 and supplies the processed image data to the determination unit 4.

This allows the in-vehicle image processing device 10 to perform optimum image processing to obtain information required for making determination based on the vehicle speed. Since, in this way, a single image recognition unit can be applied to plural image areas, the cost of the device can be held low.

<Processing Forward Image when Traveling at High Speed and Peripheral Image when Traveling at Low Speed>

Figure 3:
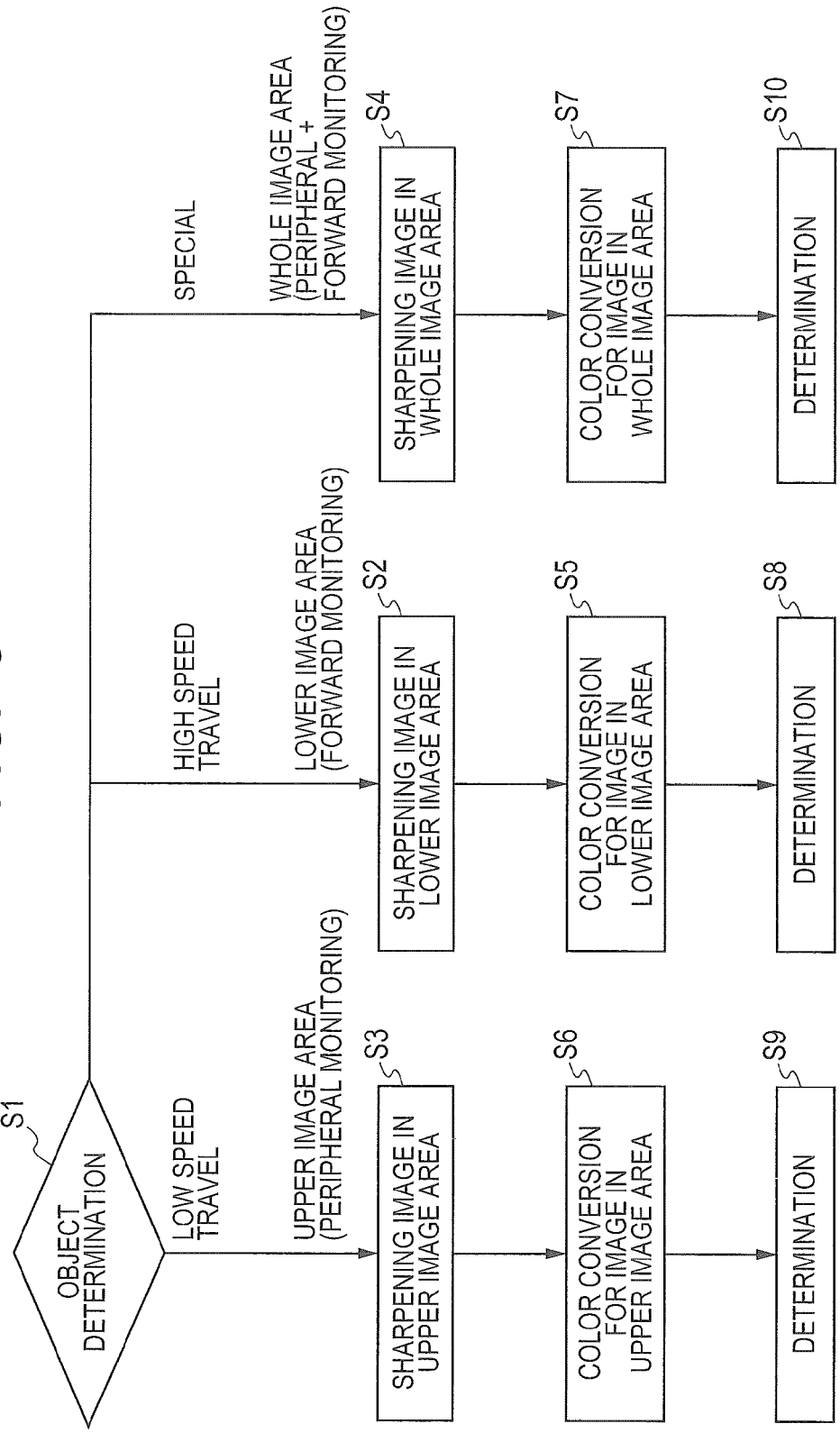
FIG. 3 is a flowchart of example image processing.

FIG. 3 is a flowchart of example image processing. It is assumed that the image shown in the image area 53 above the border line 51 is a vehicle-peripheral image.

The determination unit 4 supplies control instruction information 9 to the image recognition unit 3. The control instruction information 9 specifies, based on the speed information inputted thereto, processing to be performed by the image recognition unit 3. Referring to FIG. 3, the control instruction information 9 will be described based on the assumption that the control instruction information 9 is divided into three types associated with high-speed travel, low-speed travel, and special-speed travel, respectively. The image recognition unit 3 first determines an image area to be the object of image processing and image recognition based on the control instruction information 9 (S1). When the vehicle is traveling at high speed, forward monitoring is mainly performed, so that the image recognition unit 3 subjects the image data for the image area 52 below the border line 51 to sharpening processing S2 and color conversion processing S5, in this order, suitable for a distant view. When the vehicle is traveling at low speed, peripheral monitoring is mainly performed, so that the image recognition unit 3 subjects the image data for the image area 53 above the border line 51 to sharpening processing S3 and color conversion processing S6, in this order, suitable for a near view.

The sharpening processing is performed as a preprocessing for determining, for example, the distance from a preceding vehicle or to an object on the road or on a road shoulder based on image recognition. The sharpening processing is, for example, edge enhancement processing in which an intermediate value of a target-image brightness histogram is determined and parts crossing the intermediate value are recognized as possibly making up an edge of the target object. Edge enhancement for image sharpening is required because determining the distance between the vehicle and an outside object based on image recognition requires the object to be imaged with a sharp edge.

When forward monitoring is mainly performed with the vehicle traveling at high speed, the determination unit 4 mainly determines in determination processing S8, for example, the distance from a preceding vehicle or whether an obstacle is present forward of the vehicle. When peripheral monitoring is mainly performed with the vehicle traveling at low speed, the determination unit 4 mainly determines in determination processing S9, for example, the distance between the vehicle and a peripheral obstacle. For such determination processing, when the vehicle is running at high speed, image processing for the image area 53 above the border line 51 is omitted and, when the vehicle is traveling at low speed, image processing for the image area 52 below the border line 51 is omitted. In this way, the circuit scale of the image recognition unit 3 can be kept small, and the load generated by computing can be held small for power saving. It is also possible to perform, when the vehicle is traveling at high speed, image processing for the image area 53 above the border line 51 in parallel with image processing for a main image area, i.e. the image area 52 and also to perform, when the vehicle is traveling at low speed, image processing for the image area 52 below the border line 51 in parallel with image processing for a main image area, i.e. the image area 53. This enhances the reliability of determination processing S8 and S9.

The above arrangement also makes it possible to mainly perform, when the vehicle is traveling at high speed, forward monitoring and reflect information obtained by the forward monitoring on the image data obtained by peripheral monitoring so as to improve the accuracy of image recognition and also to mainly perform, when the vehicle is traveling at low speed, peripheral monitoring and reflect information obtained by the peripheral monitoring on the image data obtained by forward monitoring so as to improve the accuracy of image recognition.

In addition to the above processing to be performed when the vehicle is traveling at high speed or low speed, the determination unit 4 can also instruct the image recognition unit 3 to perform special processing. Namely, the determination unit 4 can supply control instruction information 8 to the image recognition unit 3 for having the image data for both the image area 52 below the border line 51 and the image area 53 above the border line 51 subjected to intermediate sharpening processing S4 and intermediate color conversion processing S7 relative to image processing suitable for a distant view and image processing suitable for a near view. This makes it possible to perform appropriate image processing even when the vehicle is traveling at speed determined neither as high speed nor as low speed.

<Structure of Camera Module>

Figure 4:
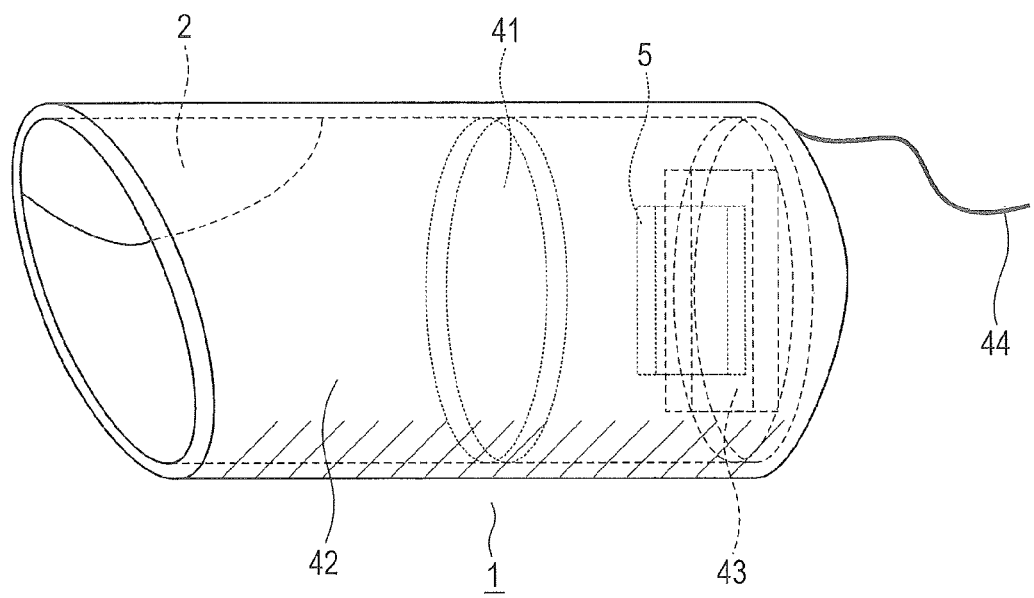
FIG. 4 is an external view of a camera module showing an example structure thereof.
Figure 5:
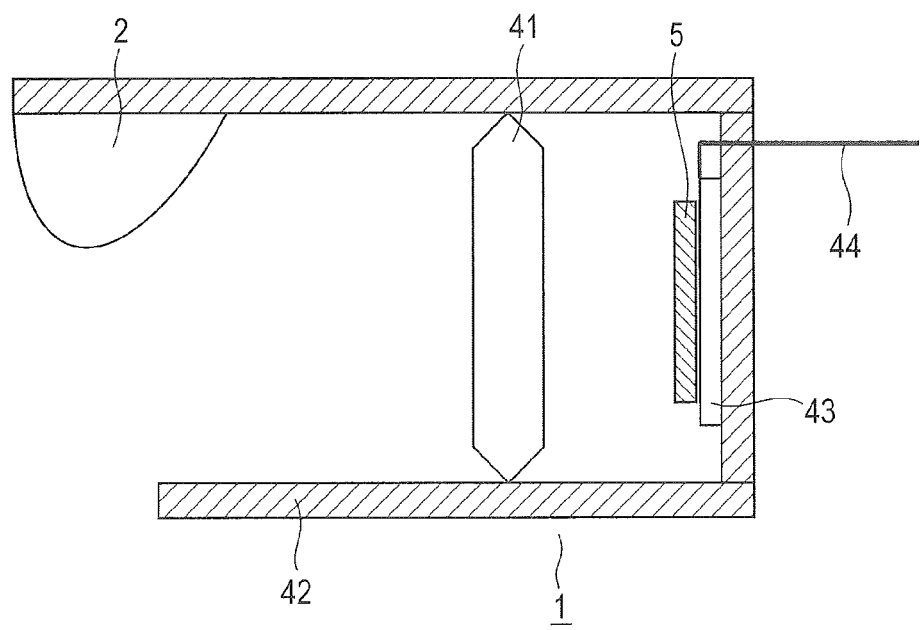
FIG. 5 is a side sectional view of the camera module.

FIG. 4 is an external view of a camera module 1 showing an example structure thereof. FIG. 5 is a side sectional view of the camera module 1. The camera module 1 includes an image sensor 5 which is mounted on a substrate 43 and is coupled with wiring 44 and an optical system including a lens 41 both housed in a housing cover 42. A reflector 2 is installed in an incident-light path of the camera module. The incident light is incident on the image sensor 5 through the lens 41. Referring to FIG. 4, inner parts of the camera module 1 are shown in broken lines as a phantom view through the housing cover 42. When the reflector 2 is not installed, a forward image can be inputted as it is to the whole surface of the image sensor 5. When the reflector 2 is installed, the portion not blocked by the reflector 2 of a forward image is inputted as it is to the image sensor 5 and, at the same time, a peripheral view reflected by the reflector 2 is also inputted to the image sensor 5.

The lens 41 and other elements included in the optical system are preferably fixed in position regardless of whether the vehicle is traveling at high speed, low speed, or special speed. With the optical system fixedly installed, the border line 51 is fixed on an image 50. This allows the configuration of the image recognition unit 3 to be simplified or can prevent the computing load generated by image processing by the image recognition unit 3 from increasing. The cost of the camera module 1 can also be held low. Furthermore, with no moving elements included in the optical system, the durability and reliability of the camera module 1 against vibrations of the vehicle can be enhanced.

Alternatively, the lens 41 and other elements included in the optical system may be moved in association with control instruction information associated with high-speed traveling, low-speed traveling, or special-speed traveling. For example, when forward monitoring is mainly performed with the vehicle traveling at high speed, the lens 41 may be moved to a position where the lens 41 focuses on a relatively distant view; when peripheral monitoring is mainly performed with the vehicle traveling at low speed, the lens 41 may be moved to a position where the lens 41 focuses on a relatively near view; and when both forward monitoring and peripheral monitoring are performed with the vehicle traveling at a special speed, the lens 41 may be moved to a position where the lens 41 focuses on an intermediate distance view. This makes accurate image recognition possible.

<Detailed Configuration Example of in-Vehicle Image Processing Device>

Figure 6:
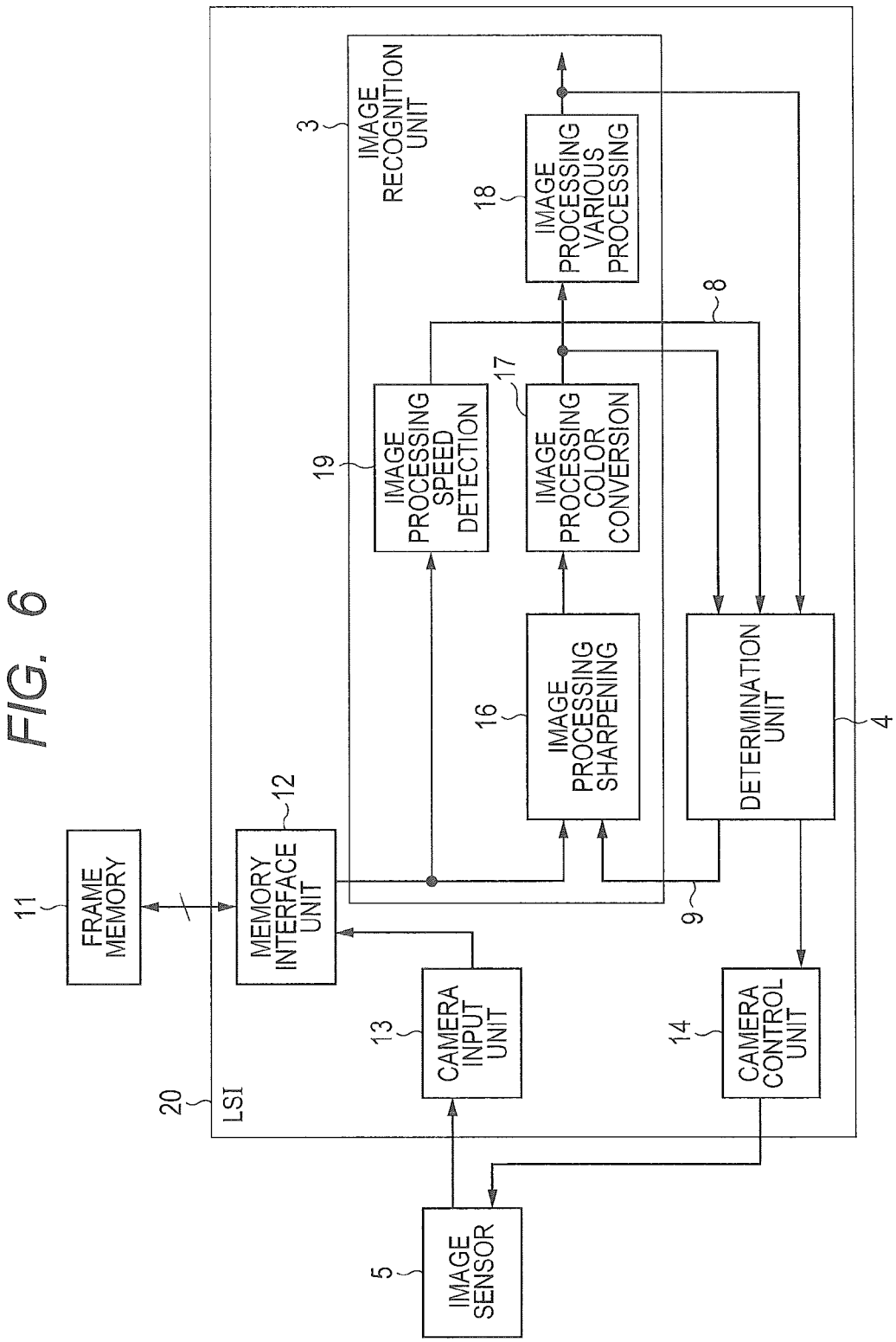
FIG. 6 is a block diagram showing an example configuration of the in-vehicle image processing device in detail.

FIG. 6 is a block diagram showing an example configuration of the in-vehicle image processing device 10 in detail. The in-vehicle image processing device 10 includes the image sensor 5 mounted in the camera module 1, an LSI 20, and a frame memory 11. The LSI 20 includes the image recognition unit 3, the determination unit 4, a memory interface unit 12, a camera input unit 13, and a camera control unit 14.

The camera input unit 13 receives the image data from the image sensor 5 and writes the image data to the frame memory 11 via the memory interface unit 12. When the image data received from the image sensor 5 is an analog signal, the camera input unit 13 converts, using an A/D converter, the analog signal into sequential digital data and writes the sequential digital data to the frame memory 11. The camera input unit 13 may be configured to be capable of preprocessing an image signal in various ways.

The image recognition unit 3 includes an image processing unit 16 to perform sharpening processing, an image processing unit 17 to perform color conversion processing, and an image processing unit 18 to perform other types of processing. The image recognition unit 3 further includes an image processing unit 19 to perform speed detection. The image recognition unit 3 receives image data from the frame memory 11 via the memory interface unit 12. The image processing unit 19 to perform speed detection detects the vehicle speed based on image data. Speed information 8 representing, for example, the traveling speed of the vehicle can be obtained by determining, using plural frames of image data, temporal changes in distance between the vehicle and an object on the road or on a road shoulder. The speed information 8 obtained is supplied to the determination unit 4. The determination unit 4 supplies, based on the speed information 8, control instruction information 9 to the image recognition unit 3. The image recognition unit 3 performs, based on the control instruction information 9, sharpening processing, color conversion processing, other types of image processing, and image recognition processing at the image processing units 16, 17, and 18, and supplies the resultant data to the determination unit 4. Using the data received from the image recognition unit 3, the determination unit 4 can make various determination to perform control, for example, for automatic driving and safety securing based on the distance from a preceding vehicle or a peripheral object or obstacle. The determination unit 4 also controls the image sensor 5 via the camera control unit 14.

Figure 7:
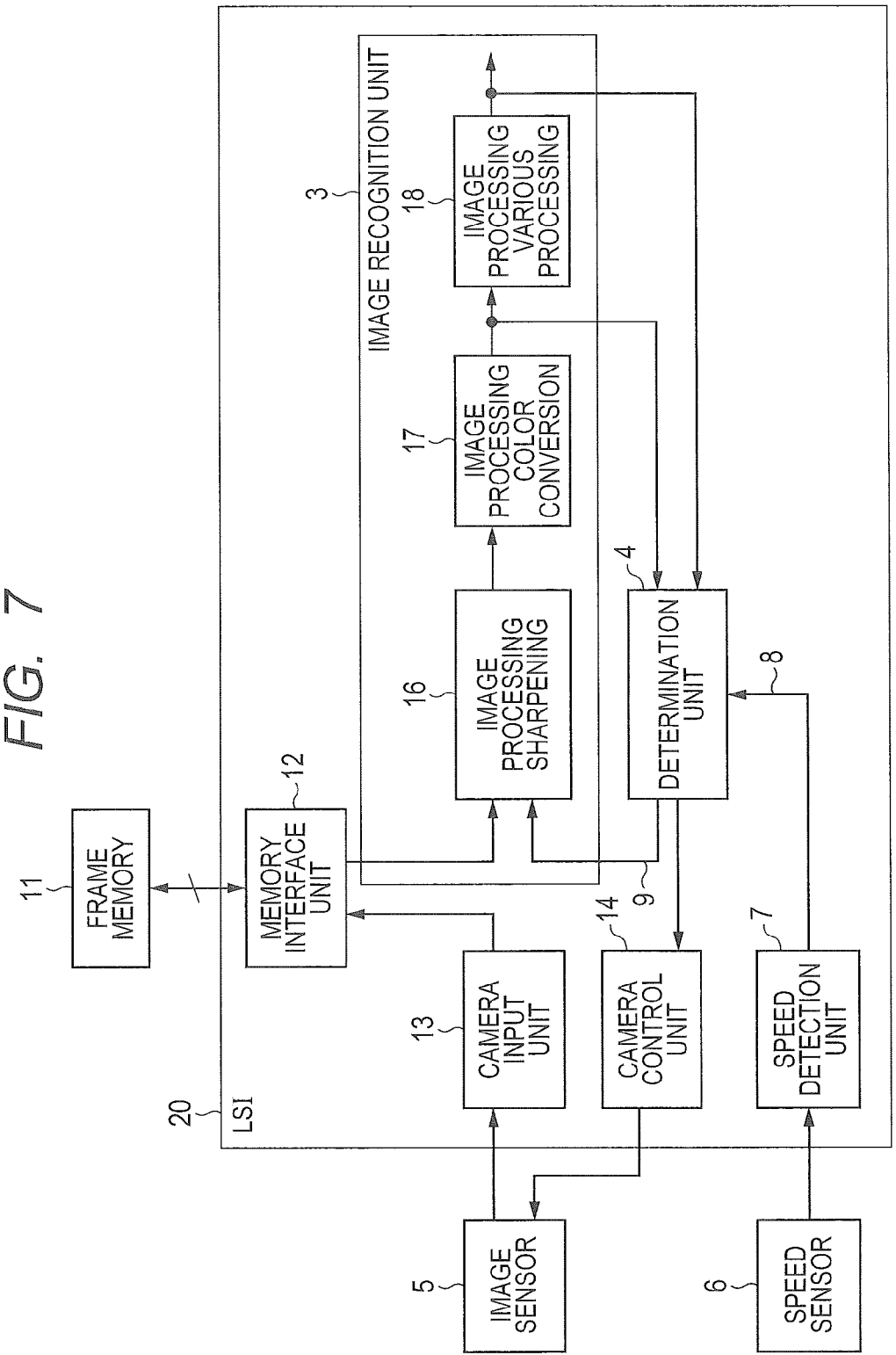
FIG. 7 is a block diagram showing another example configuration of the in-vehicle image processing device in detail.

FIG. 7 is a block diagram showing another example configuration of the in-vehicle image processing device 10 in detail. The in-vehicle image processing device 10 includes the image sensor 5 mounted in the camera module 1, a speed sensor 6, an LSI 20 which includes the image recognition unit 3 and the determination unit 4, and the frame memory 11. Differing from the in-vehicle image processing device 10 shown in FIG. 6, the in-vehicle image processing device 10 shown in FIG. 7 includes the speed sensor 6 and a speed detection unit 7 which is included in the LSI 20 and does not include the image processing unit 19 to perform speed detection that is included in the in-vehicle image processing device 10 shown in FIG. 6. In the in-vehicle image processing device 10 shown in FIG. 7, a signal dependent on the vehicle speed detected by the speed sensor 6 is collected as speed information 8 and is inputted to the determination unit 4 via the speed detection unit 7. In other respects of the configuration and operation, the in-vehicle image processing device 10 shown in FIG. 7 is identical to that shown in FIG. 6, so that duplicate description will be omitted in the following.

Comparing the in-vehicle image processing device 10 shown in FIG. 6 with that shown in FIG. 7, the in-vehicle image processing device 10 shown in FIG. 6 does not require any speed sensor signal to be inputted from outside. This makes it possible to provide a lower-cost in-vehicle image processing device. In the case of the in-vehicle image processing device 10 shown in FIG. 7, the speed information 8 is inputted from the dedicated speed sensor 6, so that the vehicle speed can be determined accurately.

It is also possible that an in-vehicle image processing device 10 includes both the speed detection unit 7 and the image processing unit 19 to perform speed detection so as to allow the speed information 8 extracted by the respective units to be supplied to the determination unit 4. In this way, the signal inputted from the speed sensor 6 and the speed information 8 calculated by the image recognition unit 3 can be made use of in a mutually complementary manner. This makes it possible to provide an in-vehicle image processing device 10 capable of determining the vehicle speed with higher accuracy.

Figure 8:
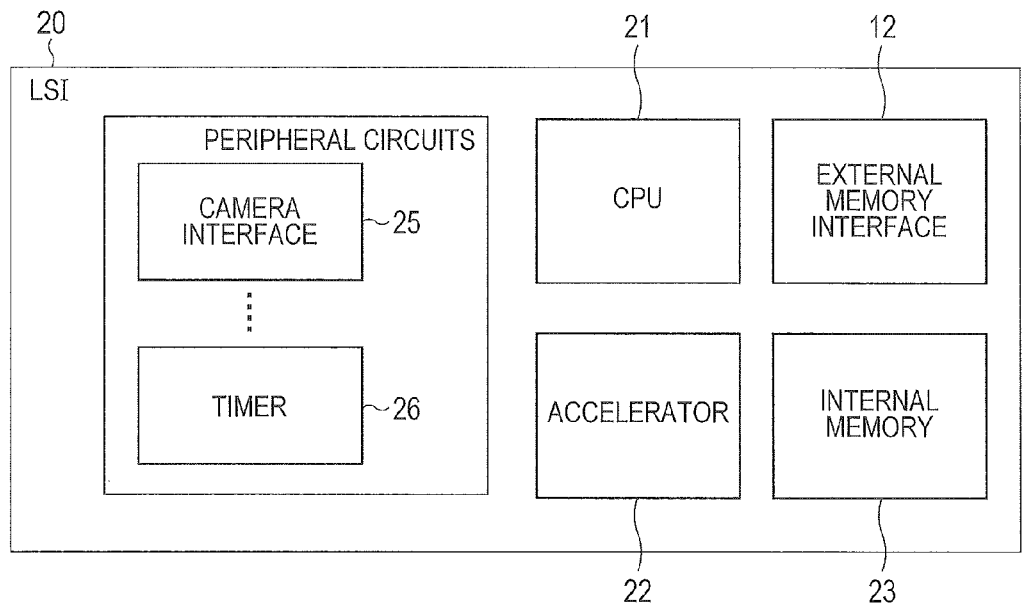
FIG. 8 is a block diagram showing an example configuration of an LSI mounted in the in-vehicle image processing device.

FIG. 8 is a block diagram showing an example configuration of the LSI (semiconductor device) 20 mounted in the in-vehicle image processing device 10. The LSI 20 includes a CPU (central processing unit) 21, an external memory interface 12, an accelerator 22, an internal memory 23, and peripheral circuits. The peripheral circuits include a camera interface unit 25 having a camera input unit 13 and a camera control unit 14 and a timer 26. For example, the timer 26 can make up a speed detection unit 7 to determine the speed information 8 by periodically counting pulses which are inputted from the speed sensor 6 and are proportional to the rotation speed of vehicle tires. Various image processing units such as the image processing units 16, 17, 18, and 19 included in the image recognition unit 3 are mounted, for example, in the accelerator 22. The functions of the determination unit 4 are installed by having the CPU 21 execute programs stored in the internal memory 23.

The LSI 20 is formed over a single semiconductor substrate of silicon, for example, using, but not limited to, publicly known CMOS (complementary metal-oxide semiconductor field effect transistor) fabrication technology. The LSI 20 may include plural chips, or it may be formed in a single chip further including the frame memory 11. Integrating the LSI 20 in a single chip reduces the device mounted area of the in-vehicle image processing device 10, so that the cost of the in-vehicle image processing device 10 can be reduced.

Second Embodiment <Stereo Camera System>

Figure 9:
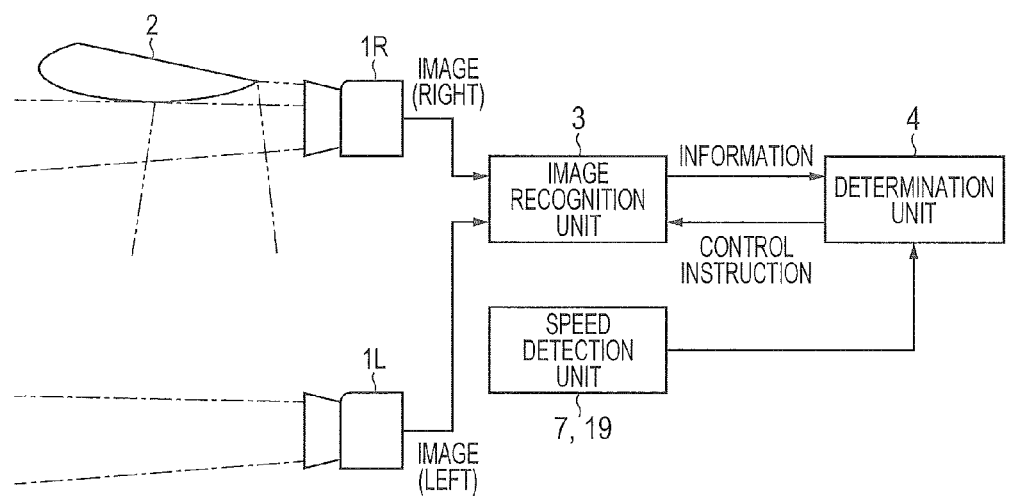
FIG. 9 is a block diagram showing an example configuration of an in-vehicle image processing device according to a second embodiment of the present invention.

FIG. 9 is a block diagram showing an example configuration of an in-vehicle image processing device 10 according to a second embodiment of the present invention. Differing from the in-vehicle image processing device 10 of the first embodiment, the in-vehicle image processing device 10 of the second embodiment includes a pair of left and right cameras 1L and 1R making up a stereo camera system. A stereo camera system is used as a means of measuring the distance to an object in a vision and includes two cameras. It can measure the distance to an object using parallax images. Like the in-vehicle image processing device 10 of the first embodiment, the in-vehicle image processing device 10 of the second embodiment includes an image recognition unit 3, a determination unit 4, and a speed detection unit 7 or 19. Like the reflector 2 installed in front of the camera 1 of the first embodiment, a reflector 2 is installed in front of the right camera 1R. No reflector is installed in front of the left camera 1L. The images taken by the right camera 1R and the left camera 1L are both supplied to the image recognition unit 3. The pair of left and right cameras are installed, for example, on an upper portion of the front windshield to be spaced apart from each other. Even though in FIG. 9, a reflector 2 is installed in front of the right camera 1R, the reflector 2 may be installed in front of the left camera 1L.

FIGS. 10A and 10B are diagrams for explaining image data generated by the in-vehicle image processing device 10 according to the second embodiment, FIG. 10A showing image data 50L taken by the left camera 1L and FIG. 10B showing image data 50R taken by the right camera 1R. The image data 50R taken by the right camera 1R includes, similarly to the image data 50 shown in FIG. 2, image data for an image area 52R below a border line 51R and image data for an image area 53R above the border line 51R. The image area 52R below the border line 51R shows a vehicle-forward image directly taken without involving the reflector 2. The image area 53R above the border line 51R shows a vehicle-peripheral image taken via the reflector 2. The image data 50L taken by the left camera 1L is for a full-frame image area 52L to show a vehicle-forward image.

The determination unit 4 receives speed information 8 on the vehicle. The in-vehicle image processing device 10 may be configured, as in the example shown in FIG. 1, to detect speed information 8 using an independent speed detection unit 7 included therein and supply the detected speed information 8 to a determination unit 4. Alternatively, the in-vehicle image processing device 10 may be configured to detect speed information 8 using a speed detection unit 19 realized, as described in the foregoing, as a part of the function of an image recognition unit 3 and supply the detected speed information 8 to the determination unit 4. Based on the speed information 8 supplied thereto, the determination unit 4 supplies control instruction information 9 to the image recognition unit 3.

The image recognition unit 3 receives the image data 50L and 50R from the left and right cameras 1L and 1R, performs image processing based on the control instruction information 9 supplied from the determination unit 4, and supplies the result of image processing to the determination unit 4.

Figure 11:
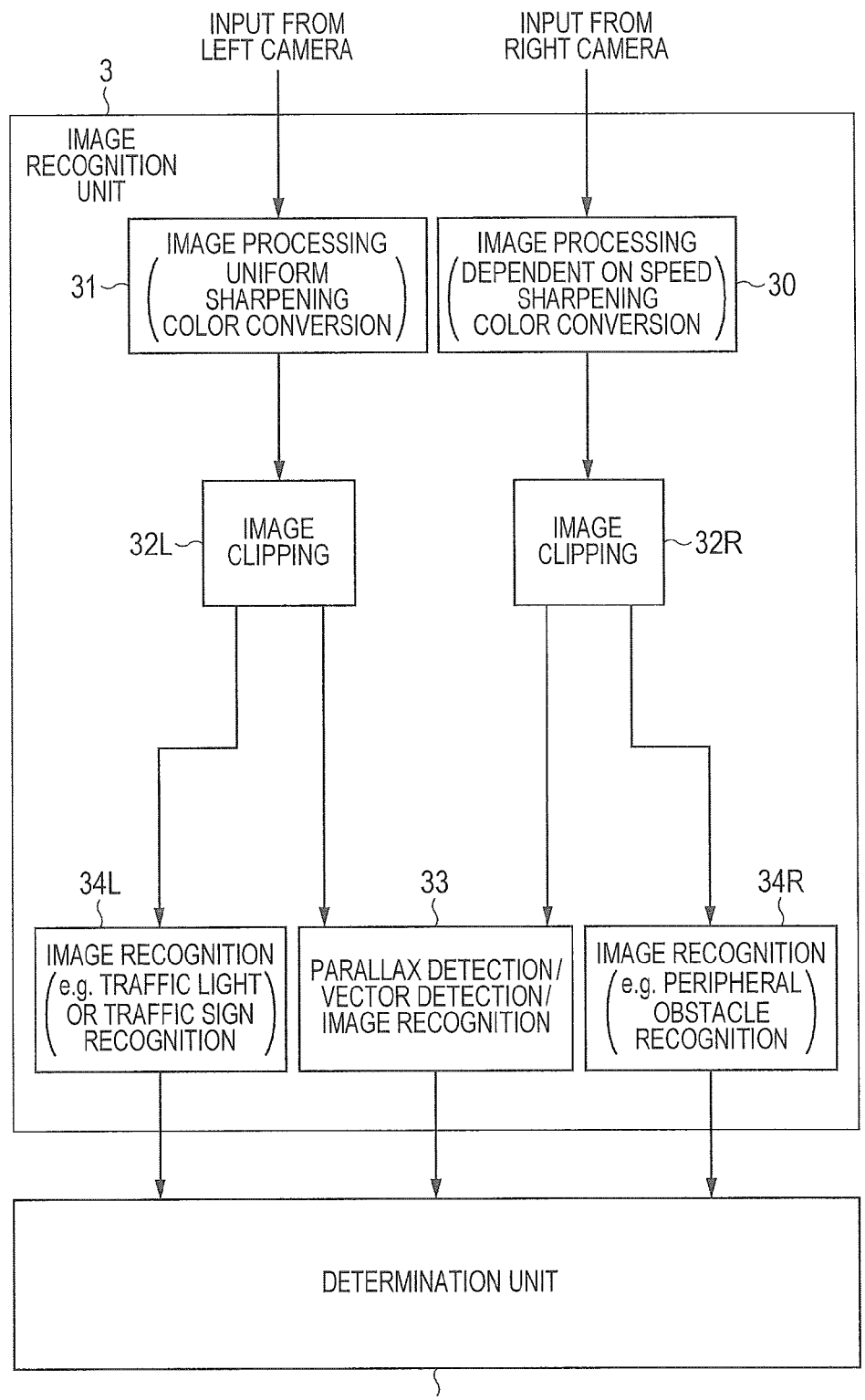
FIG. 11 is a flowchart of example image processing.

FIG. 11 is a flowchart of example image processing. In the image recognition unit 3, the image data 50R received from the right camera 1R is, based on the control instruction information 9 supplied from the determination 4, subjected to image processing 30 for sharpening and color conversion dependent on the vehicle speed. The contents of the image processing 30 may be arranged to be similar to those shown in the flowchart of FIG. 3. On the other hand, the image data 50L received from the left camera 1L is subjected to image processing 31 for uniform sharpening and color conversion processing for an entire frame. The image processing 31 is not dependent on the vehicle speed.

Next, based on the results of the above image processing, image clipping 32R and 32L is performed. In image clipping 32R and 32L, the image data taken concurrently by the left and right cameras 1L and 1R is clipped into pairs of concurrently taken left-camera image data and right-camera image data, with the left-camera image data and right-camera image data in each pair including image data on a same object between them and the other pairs of concurrently taken left-camera image data and right-camera image data with the left-camera image data and right-camera image data in each pair including no image data on any same object between them. The image data on a same object taken concurrently by the left and right cameras 1L and 1R can be used for image processing to be performed making use of the parallax between the left and right images, i.e. for image recognition 33 to be performed involving parallax detection or vector detection. This type of image data mainly includes image data on an area forward of the vehicle. The other pairs of concurrently taken left-camera image data and right-camera image data can be used for image recognition processing for different purposes. For example, the image data 50L taken by the left camera 1L represents an image of an area forward of the vehicle (a vehicle-forward image) an upper portion of which possibly showing a traffic light and/or a traffic sign. Thus, the image data 50L can be used for image recognition processing 34L. The image data 50R taken by the right camera 1R, on the other hand, includes the image data for the image area 53R taken by the right camera 1R via the reflector 2. The image data for the image area 53R represents an image of an area around the vehicle (a vehicle-peripheral image), so that it is used for image recognition processing 34R for recognizing peripheral objects or obstacles. The results of image recognition processing 33, 34R, and 34L are supplied to the determination unit 4.

As described above, in the stereo camera system, it is possible to appropriately switch, based on the vehicle speed, between image processing including parallax detection and vector detection performed based on vehicle-forward images and vehicle-peripheral image processing to be performed for making determination.

For example, when the vehicle is traveling at high speed, priority is placed on forward monitoring, so that, as for the image data 50R taken by the right camera 1R, the image data for the image area 52R representing a vehicle-forward image is subjected to image processing 30 in which sharpening processing and color conversion processing suitable for a distant view is performed. The image data for the image area 52R thus processed is clipped by image clipping 32R and is supplied to an image recognition unit 33. The image data 50L taken by the left camera 1L, on the other hand, is subjected to image processing 31 in which the image data for the image area 52L representing a vehicle-forward image undergoes sharpening processing and color conversion processing suitable for a distant view. The image data for the image area 52L thus processed is clipped by image clipping 32L and is supplied to the image recognition unit 33. Subsequently, the image data for a lower portion of the image area 52L is clipped, and the lower portion image data thus clipped is supplied to the image recognition unit 33 for matching with the image data for the image area 52R taken by the right camera. On the other hand, the image data for an upper portion of the image area 52L that represents a vehicle-forward image possibly showing a traffic light or traffic sign is clipped by image clipping 32L and is supplied to an image recognition unit 34L. The image recognition unit 33 thus receives a pair of image data taken by the left and right cameras with the pair of image data representing a pair of images of a same object. By detecting the parallax between the pair of image data, the distance to the object, for example, the distance to a preceding vehicle or an obstacle can be calculated. Moreover, determining frame-to-frame changes in the distance to the object makes vector detection possible. This enables image recognition processing for determining whether the object is a preceding vehicle or an obstacle. In the image recognition unit 34L, recognition processing for detecting a traffic light and/or a traffic sign is performed using the image data on a forward and upward area that cannot be taken by the right camera 1R because of the presence of the reflector 2. Even though processing based on a parallax cannot be performed, the distance to an object can be calculated or estimated taking into account road surface feature points determined in the image recognition unit 33 using a parallax. In the image processing unit 30, when the vehicle is traveling at high speed, processing of the image data for the image area 51R taken via the reflector 2 may be omitted. In this case, an image recognition unit 34R does not operate, either.

When the vehicle is traveling at low speed, priority is placed on peripheral monitoring, so that the image data 50R taken by the right camera 1R is subjected to image processing 30 in which the image data for the image area 53R showing a vehicle-peripheral image undergoes sharpening processing and color conversion processing suitable for a near view. The image data thus processed is clipped by image clipping 32R and is supplied to the image recognition unit 34R. for use in recognition processing, for example, to detect a peripheral obstacle. In this case, for the image data for the image area 52R taken by the right camera 1R to show a vehicle-forward image, image processing 30 is omitted, so that the image recognition unit 33 is supplied only with the image data for the image area 52L taken by the left camera 1L to show a vehicle-forward image. In this case, the image recognition unit 33 provided only with the image data taken by one of the two cameras cannot perform parallax detection. With the vehicle traveling at low speed, however, omitting image processing for a vehicle-forward view, a distant view in particular, does not cause a serious problem.

The image processing 30 may be arranged to include processing similar to the special processing described in the foregoing with reference to FIG. 3. In this case, in image processing 30, of the image data 50R received from the right camera 1R, the image data for the image area 52R below the border line 51R and the image data for the image area 53R above the border line 51R are both subjected to intermediate sharpening processing and color conversion processing relative to sharpening processing and color conversion processing for a distant view and for a near view. The respective image data thus processed are clipped in image clipping 32R, then the image data for the image area 52R below the border line 51R is supplied to the image recognition unit 33, for example, for use in parallax detection and the image data for the image area 53R above the border line 51R is supplied to the image recognition unit 34R, for example, for use in peripheral area recognition. The sharpening processing and color conversion processing performed in this case are not optimized either for a distance view or for a near view, so that the accuracy of image recognition may somewhat be sacrificed. This approach is, however, effective in monitoring vehicle-forward and vehicle-peripheral areas simultaneously.

Third Embodiment <Left and Right Cameras Each Provided with Reflector>

Figure 12:
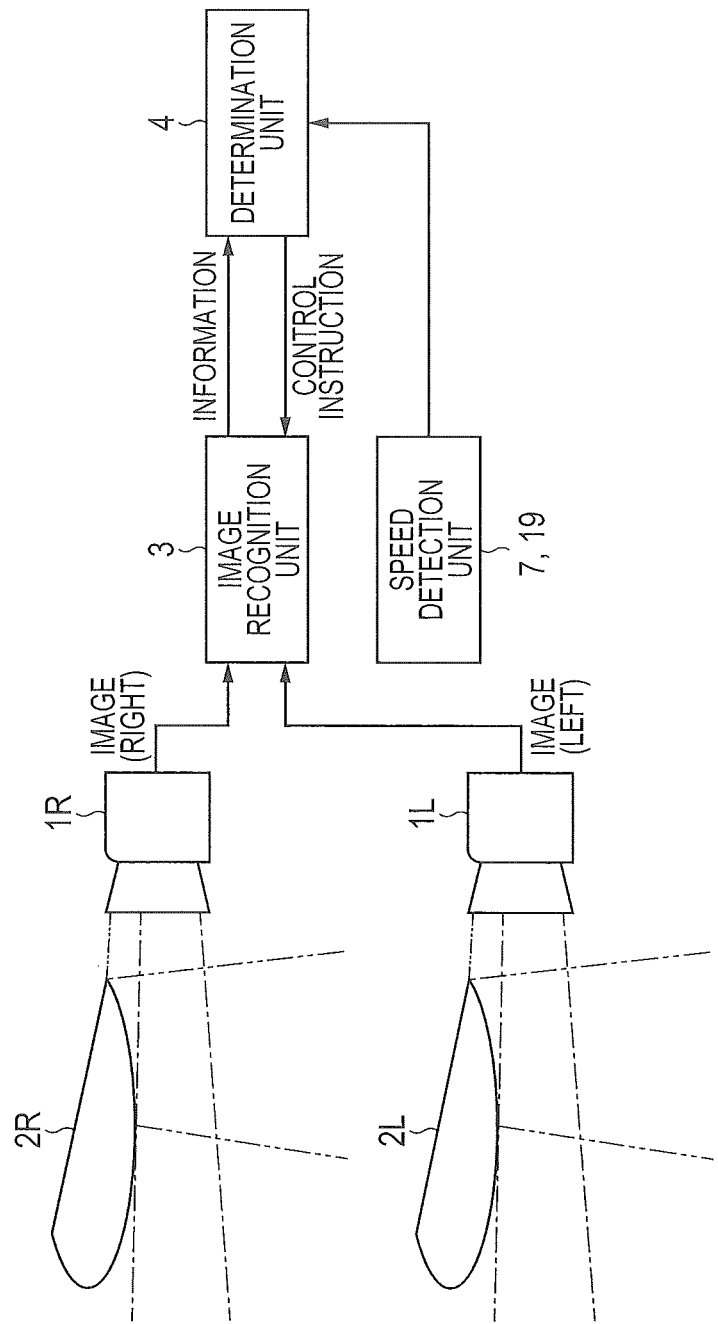
FIG. 12 is a block diagram showing an example configuration of an in-vehicle image processing device according to a third embodiment of the present invention.

FIG. 12 is a block diagram showing an example configuration of an in-vehicle image processing device 10 according to a third embodiment of the present invention. Differing from the in-vehicle image processing device 10 of the second embodiment, a pair of left and right cameras 1L and 1R are provided with left and right reflectors 2L and 2R, respectively. Like the in-vehicle image processing device 10 of the second embodiment, the in-vehicle image processing device 10 of the third embodiment also includes an image recognition unit 3, a determination unit 4, and a speed detection unit 7 or 19.

FIGS. 13A and 13B are diagrams for explaining image data generated by the in-vehicle image processing device 10 according to the third embodiment, FIG. 13A showing image data 50L taken by the left camera 1L and FIG. 13B showing image data 50R taken by the right camera 1R. Of the image data 50L and 50R taken by the left and right cameras 1L and 1R, the image data 50L includes the image data for an image area 52L below a border line 51L and the image data for an image area 53L above the border line 51L, and the image data 50R includes the image data for an image area 52R below a border line 51R and the image data for an image area 53R above the border line 51R.

The determination unit 4 receives speed information 8 on the vehicle. The in-vehicle image processing device 10 may be configured, as in the example shown in FIG. 1, to detect speed information 8 using an independent speed detection unit 7 included therein and supply the detected speed information 8 to a determination unit 4. Alternatively, the in-vehicle image processing device 10 may be configured to detect speed information 8 using a speed detection unit 19 realized, as described in the foregoing, as a part of the function of an image recognition unit 3 and supply the detected speed information 8 to a determination unit 4. Based on the speed information 8 supplied thereto, the determination unit 4 supplies control instruction information 9 to the image recognition unit 3.

The image recognition unit 3 receives the image data 50L and 50R from the left and right cameras 1L and 1R, performs image processing based on the control instruction information 9 supplied from the determination unit 4, and supplies the result of image processing to the determination unit 4.

The image processing to be performed by the image recognition unit 3 may be arranged to be similar to the processing illustrated in FIG. 11 referred to in connection with the second embodiment, but image processing 31 is arranged, like image processing 30 dependent on the vehicle speed, to be similar to the processing performed according to the flowchart shown in FIG. 3. Image data 50L inputted from a left camera 1L includes the image data for an image area 52L to show a vehicle-forward image and the image data for an image area 53L to show a vehicle-peripheral image. It is, therefore, possible to place priority on forward monitoring by giving attention to the image area 52L when the vehicle is traveling at high speed and, when the vehicle is traveling at low speed, to place priority on peripheral monitoring by giving attention to the image area 53L. Next, the results of processing the respective image data are subjected to image clipping 32R and 32L. In image clipping 32R and 32L, the image data taken concurrently by the left and right cameras 1L and 1R is clipped into pairs of concurrently taken left-camera image data and right-camera image data, with the left-camera image data and right-camera image data in each pair including image data on a same object between them and the other pairs of concurrently taken left-camera image data and right-camera image data with the left-camera image data and right-camera image data in each pair including no image data on any same object between them.

In the second embodiment described in the foregoing, only the image data for the image areas 52L and 52R to show vehicle-forward images is clipped to be supplied to the image recognition unit 33 to perform parallax detection. In the third embodiment, there are also pairs of image data for the image areas 53L and 53R taken by the left and right cameras 1L and 1R to show vehicle-peripheral areas, with the left-camera image data and the right-camera image data in each of the pairs including image data on a same object between them. Such pairs of image data are clipped by image clipping 32R and 32L and are then supplied to the image recognition unit 33 for use in parallax detection. The other pairs of image data for the image areas 53L and 53R with the left-camera image data and the right-camera image data in each of such other pairs not including any image data on any same object between them are clipped by image clipping 32R and 32L and are then supplied to the left and right image recognition units 34L and 34R, respectively.

This enables, even during peripheral monitoring with the vehicle traveling at low speed, parallax detection using the stereo camera system and distance calculation based on the detected parallax.

Fourth Embodiment <Viewpoint Change and Synthesis>

The image data clipped in the image recognition unit 3 for the image areas 52, 52L, and 52R to show vehicle-forward images and for the image areas 53, 53L, and 53R to show vehicle-peripheral images are images taken from the viewpoints of the cameras 1, 1L, and 1R. Applying viewpoint conversion processing to such image data makes it possible to synthesize images from different viewpoints. For example, an image of the vehicle seen from above can be synthesized. Such an image can be synthesized using either a single camera or plural cameras of a stereo camera system. Synthesizing such an image will be described below based on an example case in which only one camera is used, for simpler description.

Figure 14:
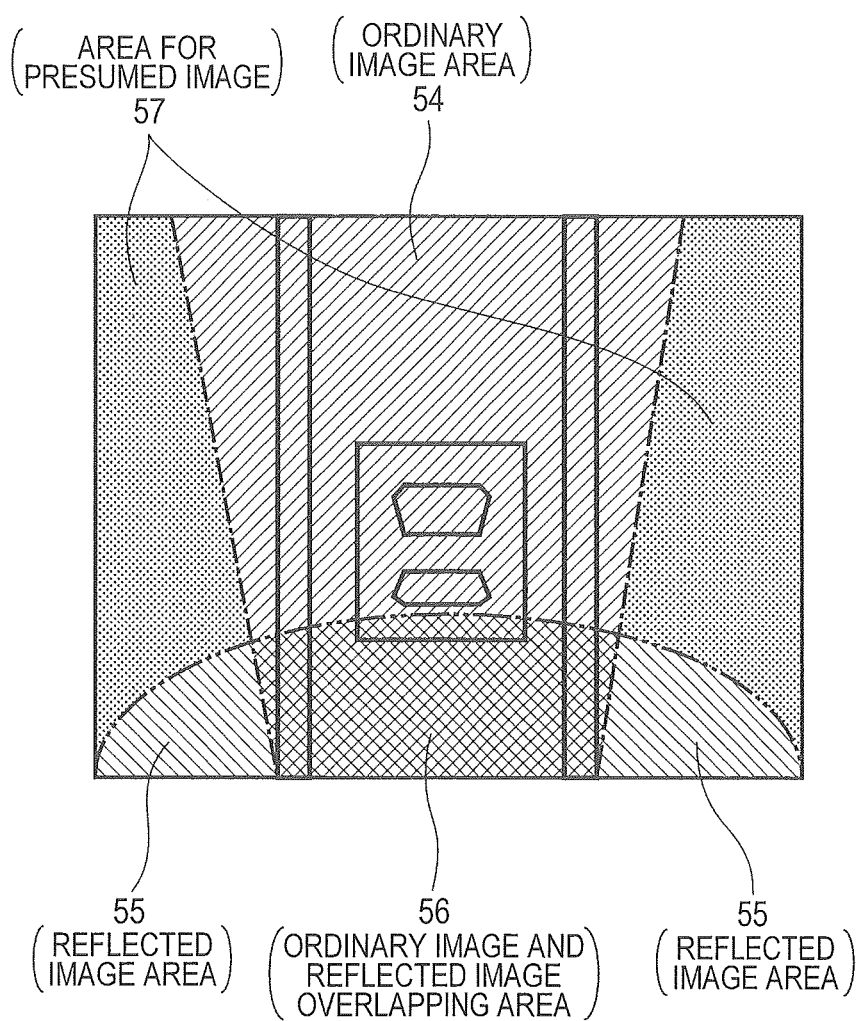
FIG. 14 is an explanatory diagram showing image data synthesized by an in-vehicle image processing device according to a fourth embodiment of the present invention.

FIG. 14 is an explanatory diagram showing image data synthesized by an in-vehicle image processing device according to a fourth embodiment of the present invention.

In image data synthesis, image data is divided into six areas of four types. Referring to FIG. 14, the four types represent an ordinary image area 54, a reflected image area 55, an overlapping area 56 where the ordinary image and the reflected image overlap each other, and other areas 57 not included in either the ordinary image area 54 or the reflected image area 55. The areas 57 not included in either the ordinary image area 54 or the reflected image area 55 correspond to blind spots of the camera. As shown in FIG. 14, the areas 57 not included in either the ordinary image area 54 or the reflected image area 55 are in the left and right portions of the image display. The ordinary image area 54 shows an image generated by a viewpoint change based on the image data for the image area 52 to show a vehicle-forward image. The reflected image area 55 shows an image generated by a viewpoint change based on the image data for the image area 53 to show a vehicle-peripheral image. The vehicle-forward image shown in the image area 52 and the vehicle-peripheral image shown in the image area 53 overlap each other. The image data for the overlapping area 56 is synthesized by changing the viewpoints of the respective overlapping images and combining them in a mutually complementary manner. In cases where a stereo camera system is used, image synthesis accuracy may be increased by using the parallax between the overlapping images. For the areas 57 not included in either the ordinary image area 54 or the reflected image area 55, images are generated by presumption based on image data on past frames or based on image data on edge portions of other image areas, or image data for indicating that the image data on such areas cannot be presumed is outputted.

The above arrangement makes it possible to provide an in-vehicle image processing device which can generate an image based on a changed viewpoint using fewer cameras than required in the related art and a single image recognition unit. Also, generating images for blind spots by presumption makes it possible to provide an in-vehicle image processing device which can generate image data, covering even blind spots of cameras, based on a changed viewpoint.

The invention made by the present inventors has been described in concrete terms based on exemplary embodiments. However, the present invention is not limited to such embodiments and can be modified in various ways without departing from the scope of the invention.

For example, even though the areas imaged by a camera provided with a reflector have been described mainly as areas forward of and around the vehicle, areas rearward of and inside the vehicle may be mainly imaged by such a camera. Also, the direction of imaging may be changed using a prism or a lens instead of a reflector.

What is claimed is:

1. An in-vehicle image processing device for mounting on a vehicle, comprising a camera, an image recognition unit, and a determination unit,
    wherein the determination unit is configured to be able to receive speed information on the vehicle and supply control instruction information based on the speed information to the image recognition unit,
    wherein the image recognition unit is configured to be able to:
        receive image data from the camera, the image data including image data for a first image area to show an image of an area forward of the vehicle and image data for a second image area to show an image of an area in a different direction, the first image area and the second image area both being simultaneously included in a frame;
        subject the image data for both the first image area and the second image area to image processing based on the control instruction information; and
        supply results of the image processing to the determination unit, and
    wherein the second image area includes an image of a peripheral area around the vehicle, as obtained from a reflector mounted on the camera, the reflector permitting the camera to simultaneously obtain image data for the first image area and image data for the second image area by reason that the reflector is shaped in a convex contour and is mounted in a location to provide a vehicle-peripheral image for the second image area while permitting a vehicle-forward image for the first image area, the vehicle-peripheral image providing information of a periphery of the vehicle-forward image.

2. The in-vehicle image processing device according to claim 1, wherein the determination unit is configured to be able to supply control instruction information to the image recognition unit, the control instruction information being for, when the speed information indicates that the vehicle is traveling at high speed, having the image data for the first image area processed in a manner suitable for a distant view while having image processing omitted for the image data for the second image area and being for, when the speed information indicates that the vehicle is traveling at low speed, having the image data for the second image area processed in a manner suitable for a near view while having image processing omitted for the image data for the first image area.

3. The in-vehicle image processing device according to claim 2,
    wherein the determination unit is configured to be able to supply control instruction information to the image recognition unit, the control instruction information being for having both the image data for the first image area and the image data for the second image area processed in a manner suitable for an intermediate distance view relative to image processing suitable for a distant view and image processing suitable for a near view.

4. The in-vehicle image processing device according to claim 1,
    wherein the image recognition unit further has a function for calculating, based on the image data, speed information on the vehicle and supplying the speed information to the determination unit.

5. The in-vehicle image processing device according to claim 1, wherein the camera is used as a first camera and the image data is processed as first image data, the in-vehicle image processing device further comprising a second camera which, along with the first camera, makes up a pair of right and left cameras,
    wherein the second camera is configured to be able to supply second image data to the image recognition unit, the second image data representing an image of an area forward of the vehicle to be shown in a frame, and
    wherein the image recognition unit is configured to be able to perform image recognition processing based on a parallax between the image data for the first image area out of the first image data and the second image data.

6. The in-vehicle image processing device according to claim 5,
    wherein the second image data includes image data for a third image area to show an image of an area forward of the vehicle and image data for a fourth image area to show an image of an area around the vehicle, the third image area and the fourth image area being simultaneously included in a frame,
    wherein the image recognition unit is configured to be able to perform image recognition processing based on a parallax between the image data for the first image area included in the first image data and the image data for the third image area included in the second image data, and
    wherein the determination unit is configured to be able to supply control instruction information to the image recognition unit, the control instruction information being for, when the speed information indicates that the vehicle is traveling at high speed, having the image data for the first image area and the image data for the third image area processed in a manner suitable for a distant view while having image processing omitted for the image data for the second image area and the image data for the fourth image area and being for, when the speed information indicates that the vehicle is traveling at low speed, having the image data for the second image area and the image data for the fourth image area processed in a manner suitable for a near view while having image processing omitted for the image data for the first image area and the image data for the third image area.

7. The in-vehicle image processing device according to claim 1,
wherein the image recognition unit further has a function to convert, out of the image data, image data for each image area into image data for each image area based on a prescribed viewpoint and synthesize an image using the image data for each image area based on the prescribed viewpoint.

8. The in-vehicle image processing device according to claim 7,
wherein the image recognition unit synthesizes an image of a spot, image data on which is included in the image data for plural image areas, using the image data for plural image areas in a mutually complementary manner based on parallaxes therebetween while, for a spot, no image data on which is included in the image data for any of the plural image areas, generating an image by presumption based on image data on a past frame or based on image data for an edge portion of the plural image areas or outputting prescribed image data for indicating that image data on the spot cannot be generated by presumption.

9. A semiconductor device comprising an image recognition unit and a determination unit, the semiconductor device being capable of, by being coupled with a camera for mounting on a vehicle, configuring an in-vehicle image processing device,
wherein the determination unit is configured to be able to receive speed information on the vehicle and supply control instruction information based on the speed information to the image recognition unit,
wherein the image recognition unit is configured to be able to:
receive image data from the camera, the image data including image data for a first image area to show an image of an area forward of the vehicle and image data for a second image area to show an image of an area in a different direction, the first image area and the second image area both being simultaneously included in a frame;
subject the image data for both the first image area and the second image area to image processing based on the control instruction information; and
supply results of the image processing to the determination unit, and
wherein the second image area includes an image of a peripheral area around the vehicle as obtained from a reflector mounted on the camera, the reflector permitting the camera to simultaneously obtain image data for the first image area and image data for the second image area by reason that the reflector is shaped in a convex contour and is mounted in a location to provide a vehicle-peripheral image for the second image area while permitting a vehicle-forward image for the first image area, the vehicle-peripheral image providing information of a periphery of the vehicle-forward image.

10. The semiconductor device according to claim 9,
wherein the second image area shows an image of an area around the vehicle, and
wherein the determination unit is configured to be able to supply control instruction information to the image recognition unit, the control instruction information being for, when the speed information indicates that the vehicle is traveling at high speed, having the image data for the first image area processed in a manner suitable for a distant view while having image processing omitted for the image data for the second image area and being for, when the speed information indicates that the vehicle is traveling at low speed, having the image data for the second image area processed in a manner suitable for a near view while having image processing omitted for the image data for the first image area.

11. The semiconductor device according to claim 10,
wherein the determination unit is configured to be able to supply control instruction information to the image recognition unit, the control instruction information being for having both the image data for the first image area and the image data for the second image area processed in a manner suitable for an intermediate distance view relative to image processing suitable for a distant view and image processing suitable for a near view.

12. The semiconductor device according to claim 9,
wherein the image recognition unit further has a function for calculating, based on the image data, speed information on the vehicle and supplying the speed information to the determination unit.

13. The semiconductor device according to claim 9,
wherein the camera is used as a first camera and the image data is processed as first image data, the in-vehicle image processing device further comprising a second camera which, along with the first camera, makes up a pair of right and left cameras,
wherein the second camera is configured to be able to supply second image data to the image recognition unit of the semiconductor device, the second image data representing an image of an area forward of the vehicle to be shown in a frame, and
wherein the image recognition unit is configured to be able to perform image recognition processing based on a parallax between the image data for the first image area out of the first image data and the second image data.

14. The semiconductor device according to claim 13,
wherein the second image data includes image data for a third image area to show an image of an area forward of the vehicle and image data for a fourth image area to show an image of an area around the vehicle, the third image area and the fourth image area being simultaneously included in a frame,
wherein the image recognition unit is configured to be able to perform image recognition processing based on a parallax between the image data for the first image area included in the first image data and the image data for the third image area included in the second image data, and
wherein the determination unit is configured to be able to supply control instruction information to the image recognition unit, the control instruction information being for, when the speed information indicates that the vehicle is traveling at high speed, having the image data for the first image area and the image data for the third image area processed in a manner suitable for a distant view while having image processing omitted for the image data for the second image area and the image data for the fourth image area and being for, when the speed information indicates that the vehicle is traveling at low speed, having the image data for the second image area and the image data for the fourth image area processed in a manner suitable for a near view while having image processing omitted for the image data for the first image area and the image data for the third image area.

15. The semiconductor device according to claim 9, wherein the image recognition unit further has a function to convert, out of the image data, image data for each image area into image data for each image area based on a prescribed viewpoint and synthesize an image using the image data for each image area based on the prescribed viewpoint.

16. The semiconductor device according to claim 15, wherein the image recognition unit synthesizes an image of a spot, image data on which is included in the image data for plural image areas, using the image data for plural image areas in a mutually complementary manner based on parallaxes therebetween while, for a spot, no image data on which is included in the image data for any of the plural image areas, generating an image by presumption based on image data on a past frame or based on image data for an edge portion of the plural image areas or outputting prescribed image data for indicating that image data on the spot cannot be generated by presumption.

17. The semiconductor device according to claim 9 formed over a single semiconductor substrate.

18. The in-vehicle image processing device of claim 1, wherein said camera comprises:
    an image sensor mounted on a substrate;
    an optical system including a lens, housed in a housing cover; and
    the reflector, as attached to the housing cover.

19. The in-vehicle image processing device of claim 1, wherein both the reflector and the optical system are fixed in position in the housing cover such that a border line between the first image area and the second image area is fixed in the frame.

20. The in-vehicle image processing device of claim 1, wherein the reflector is fixed in position in the housing cover and the lens is movable in accordance with the control instruction information from the determination unit.

21. The in-vehicle image processing device of claim 1, wherein the second image area is displayed above a border line displayed on the frame and the first image area is displayed below the borderline.

* * * * *